Jan. 19, 1971          D. E. GRIMSHAW          3,555,783

PROCESS AND APPARATUS FOR TREATING LIQUIDS AND GASES

Filed Nov. 20, 1969

INVENTOR
DERALD E. GRIMSHAW

BY

ATTORNEY

United States Patent Office 3,555,783
Patented Jan. 19, 1971

3,555,783
PROCESS AND APPARATUS FOR TREATING LIQUIDS AND GASES
Derald E. Grimshaw, Denver, Colo., assignor to Environmental Services, Inc., York, Pa., a corporation of Pennsylvania
Continuation-in-part of application Ser. No. 757,253, Sept. 4, 1968. This application Nov. 20, 1969, Ser. No. 878,378
Int. Cl. B01f 3/04
U.S. Cl. 55—48                                                          9 Claims

ABSTRACT OF THE DISCLOSURE

A process and apparatus for treating liquid and separating gases which utilizes the principle of different gases having different solubility rates in a given liquid or solution and including the steps of introducing into a stream of liquid moving continuously between inlet and discharge means within a closed container completely filled with said liquid, a single gas or a mixture of two or more different gases under pressure at a rate which causes the liquid to be placed under pressure and become substantially saturated or super-saturated by either the single gas or the more readily dissolved gas of a mixture thereof at the pressures imposed upon the liquid, whereby said gas is dissolved in the liquid in greater quantities than would occur under atmospheric pressure, and simultaneously permitting undissolved amounts of such single gas or the least soluble gas in a mixture thereof to discharge relatively freely to atmosphere from the stream of liquid and thereby produce a gas-enriched liquid from which at least a small amount of the dissolved gas will be released therefrom when the pressure upon said liquid is reduced, the amount of said released gas depending upon the pressure imposed upon the liquid, while absorbing said gas, and the subsequent lower pressure.

This is a continuation-in-part of Ser. No. 757,253, filed Sept. 4, 1968, now abandoned.

BACKGROUND OF THE INVENTION

The normal procedure for producing a gas-enriched liquid is to direct gas under pressure into a liquid while freely exposed to atmospheric pressure. Such a system is used quite commonly, for example, in sewage treating plants where aerobic action is required. This type of operation usually involves the use of greatly excessive quantities of air, whereby the system is inefficient and wasteful. Also, various kinds of chemical procedures are available for separating one or several kinds of gases from a mixture thereof including, for example, the separation of the various components of natural air from each other. Such procedures, however, require specialized and complex equipment, and frequently require substantial consumption of power.

Examples of sludge treating apparatus which utilize open tanks and therefore require the introduction of excess quantities of air to reduce the B.O.D. are shown in Pats. 3,133,017 to Lambeth, and 3,175,698 to Jones. Even the closed tank of FIG. 4 of Jones has a substantial gas head above the liquid which greatly decreases the absorption of gases by the liquid in view of the law of partial pressures.

Various kinds of selective absorption of gases within certain liquid chemicals have been proposed heretofore, using apparatus of various degrees of complexity such as shown, for example, in Pat. 3,383,838 to Carson. There does not appear to be any suggestion in this type of apparatus, however, of the absorption in a closed container in which there is no gaseous head above the absorbing liquid.

SUMMARY OF THE INVENTION

It is the principal object of the present invention to utilize extremely simple equipment comprising essentially only a gas pump or compressor and a closed liquid-treating tank having a gas exhaust pressure-responsive valve discharging to atmosphere, whereby either a single gas or a mixture of gases such as, but not restricted to air may be pumped, preferably under substantial pressure, into said tank for absorption in liquid which is to be enriched, for example, by one of the gases in said mixture. Said gases have different solubility rates in said liquid, whereby a super-saturated solution of the gas and liquid, in proportion to solubility rates of the gas or gases, is formed therein while said liquid is placed under pressure corresponding to that of the gas pumped into said tank. This is rendered highly efficient by maintaining said tank completely filled with said liquid so as not to permit a head of air or other gases to exist on top of the liquid in the tank; otherwise the law of partial pressures greatly diminishes the absorption rate of the gases within the liquid. By withdrawing said liquid at a rate no greater than the feed rate, a high percentage of said gas components is dissolved in said liquid while under pressure in said tank, while any excess undissolved quantities of said gas (or components of said gas mixture) are discharged to atmosphere. Dissolving said gas or gases in said liquid under such pressure produces a super-saturated liquid which, when discharged from said tank to a lower pressure, such as atmospheric, permits the excess gas in the super-saturated solution to be released while the solution nevertheless remains substantially saturated and thus enriched by said gas which remains dissolved therein. The excess gas released from said solution may be utilized for desired purposes, while the gas-saturated solution may be used for many purposes.

Another object of the invention is to utilize the foregoing procedure for gas separating purposes which requires minimum power consumption and, by re-cycling the processed liquid, high degrees of gas separation may be effected as well as producing greater purity in the individual separated gases.

A further object of the invention is to utilize the above-described procedures for treating water contaminated with industrial or domestic waste to purify the same adequately to permit reuse or safe discharge into streams, such treatment being either of an aerobic or anaerobic nature, depending upon the gas or gases delivered to the liquid for absorption thereby.

Details of the foregoing objects and of the invention, as well as other objects thereof, are set forth in the following specification and illustrated in the attached drawing comprising a part thereof.

DESCRIPTION OF THE PREFERRED EMBODIMENTS

Depending upon the results desired, the present invention utilizes a liquid for purposes of selective separation of different gases from a mixture thereof and the same procedure also may be used to enrich a certain liquid or solution with a gas component from a mixture thereof by introducing the mixture of gases into the liquid by means of apparatus and procedures embodying the principles of the present invention.

Essentially, the present invention utilizes the theory of Henry's law which relates to the dissolving of gases in liquids, the amount dissolved depending upon the pressure maintained upon the solution. In the present invention, pressure upon the solution primarily is generated by introducing the gas or mixture of gases into the liquid or solution at suitable pressures while the solution preferably is moving between inlet and outlet of a closed tank and while maintaining the tank full of the solution to prevent a head of the gas or gases to form on top of the solution.

By way of a preliminary, elementary example of the principles involved in the present invention, it is known that, at 20° C. and at a pressure equivalent to one atmosphere, the following quantities of exemplary gases dissolve in one hundred grams of water.

| | Grams |
|---|---|
| Nitrogen | .002 |
| Oxygen | .004 |
| Hydrogen | .0002 |
| Sulfur dioxide | 10.000 |

From the foregoing, as an illustrative example of the basic principle of the invention, it will be seen that since air consists of approximately 78% nitrogen and the rest primarily oxygen, if air is discharged into water, because the solubility coefficient of $O_2$ is approximately 2.3 times that of $N_2$, a proportionately higher percentage of the oxygen in the air will be dissolved in the water than the nitrogen therein at a given pressure, and a substantial amount of excess nitrogen will be undissolved.

Figure 1:
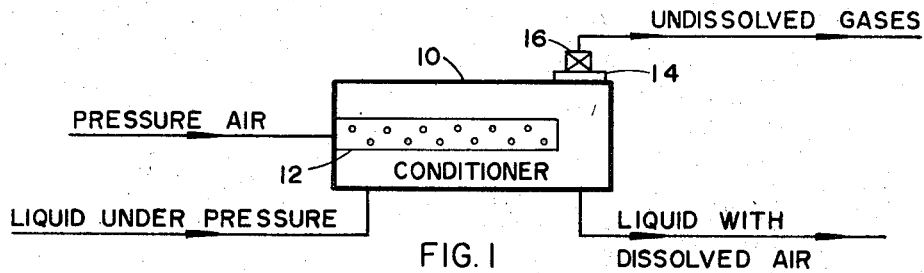
FIG. 1 is a diagrammatic representation of one form of apparatus embodying the principles of the invention for enriching a liquid with a selected gas.

Utilizing the foregoing situation to purify contaminated water for example, to reduce the B.O.D. thereof, it will be seen, by referring to FIG. 1, that if the water is introduced into closed tank 10 at a predetermined rate and is withdrawn therefrom at substantially the same rate, while air under pressure is introduced into the tank through a suitable diffusor or sparger 12 at a predetermined pressure in excess of atmospheric, and assuming that the rate of movement of the liquid between the inlet and outlet of the closed tank 10 is sufficiently slow to permit substantially complete or nearly complete saturation of the liquid with the oxygen component of the air at the pressures at which the air is introduced while there is no air head above the liquid in tank 10, it will be seen that a lesser amount of nitrogen will be dissolved and a very substantial quantity of nitrogen which is undissolved will freely pass from the liquid and may be withdrawn, for example, from a suitable discharge dome 14 which preferably is located adjacent the same end of the tank from which the gas-enriched liquid is withdrawn. The free nitrogen which accumulates in the discharge dome 14 may be packaged or released to atmosphere. A suitable valve 16, which may be either an adjustable orifice or a small gate valve which is adjustable is provided for constant escape of excess undissolved gases as well as a limited but preferably constant escape of liquid, such undissolved gases in said specific example primarily comprising nitrogen. Preferably, in order to maintain tank 10 full of water, the rate of feed is slightly greater than the rate of discharge, thus insuring such discharge of a small amount of water from valve 16.

Under the foregoing circumstances, as long as the water remains under pressure, the oxygen content therein is capable of closely approaching complete saturation, depending upon the pressure at which air is introduced and the corresponding pressure it imposes upon the water which fills the closed tank 10. At atmospheric pressure, the amount of oxygen required to bring the solution substantially to saturation is appreciably less than when air is introduced at a relatively high pressure. Accordingly, in actual practice, when a saturated solution under pressure greater than atmospheric is released to a lower pressure, such as atmospheric, a useful amount of excess oxygen is released to the atmosphere while providing a water solution which is still fully or even super-saturated with oxygen. By way of specific example, a solution 110% saturated at the time of release required four hours to be reduced to 100% saturation at atmospheric pressure.

Figure 2:
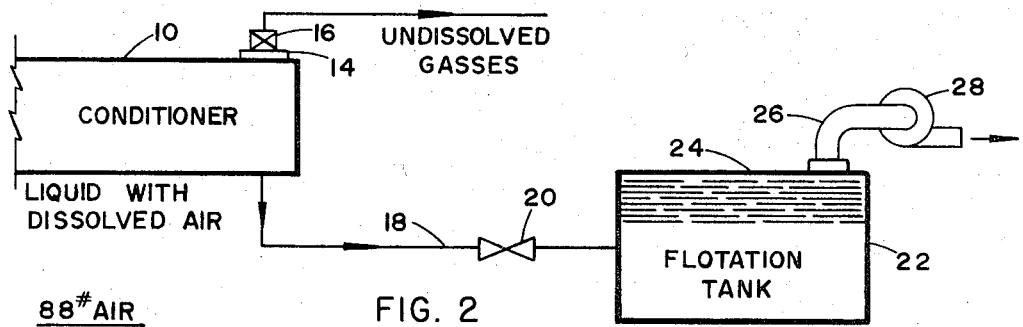
FIG. 2 is a diagrammatic arrangement of apparatus which may be used for flotation in connection with the super-saturated liquid product from the apparatus shown in FIG. 1.

An exemplary apparatus is illustrated diagrammatically in FIG. 2 for permitting the release of oxygen from such aforementioned super-saturated solution thereof. In said figure, it will be seen that a discharge conduit 18 removes the super-saturated water solution from the filled, closed conditioner tank 10 and passes it through an appropriate throttle valve 20. The discharging liquid flows into the exemplary flotation tank 22 which, if desired, may be opened to atmosphere, when, for example, utilization of the oxygen which bubbles from the water is desired for flotation or similar operations.

The oxygen discharging from the saturated water solution, upon releasing the pressure thereon, such as to atmospheric pressure, may also be collected and rendered useful for various purposes. Under such circumstances, the tank 22 is provided with a closure 24, from which a discharge conduit 26 may be led to a suitable storage or consumption apparatus. While not especially necessary, under certain conditions, removal of oxygen being released may be enhanced by the use of a pump 28 which, incidentally, will lower the pressure in the closure 24 and further enhance discharge of oxygen therefrom.

The apparatus successively shown in FIGS. 1 and 2 and the procedure described hereinabove with respect to the utilization thereof may be employed for a number of useful purposes other than the purification of water by producing a high oxygen content, and reducing the B.O.D. and C.O.D., in a contaminated solution thereof, for example. By way of several illustrative examples of other uses, it is well known that in places of public gatherings, if many people are confined in a small space, the oxygen consumed by normal breathing is reduced and is accompanied by the occupants becoming drowsy and inattentive. Such a situation occurs in class rooms in schools, auditoriums, churches and otherwise. It may easily be remedied according to this invention by continually removing the air from the rooms in which such gatherings occur, passing fresh air under pressure into a body of water contained in the closed tank 10, for example, discharging the super-oxygen saturated water into the pressure-relieving tank 22, withdrawing the excess relatively free oxygen released therefrom, and introducing such free oxygen into the aforementioned room, in addition to the makeup air supplied to the room to replace the contaminated air withdrawn therefrom, thereby greatly increasing the well being and attentiveness of the occupants. The atmosphere in hospital rooms, night clubs and similar places also can greatly be benefited by such procedure.

Especially to illustrate the effectiveness of the processes described above in conjunction with the apparatus diagrammatically illustrated in the drawings, assume that either industrially or domestically contaminated water is delivered to tank 10 and removed therefrom at any desired rate, and air is discharged into the tank 10 through diffusor 12 at a given elevated pressure in relation to retention time, the water discharging into an open flotation tank 22 such as shown in FIG. 2, will be approximately 100%+ oxygen saturated for purposes of aerobic treatment of the water to purify it.

As a further example, assume that air from an auditorium, class room or hospital room or the like, is withdrawn therefrom at any selected rate and fresh air is introduce at an elevated pressure into a closed tank through which clean water passes at a desired rate, substantially free oxygen may be recovered from the pressure - releasing tank 22 at a ratio in proportion to the pressure and retention time and is available for introduction into such auditorium and rooms to enhance the well-being of the occupants thereof, while the correspondingly oxygen-enriched water may be used for discharge into sewers or the like and thus provide at least a certain amount of preliminary aerobic treatment of the sewage passing through said sewer.

Figure 3:
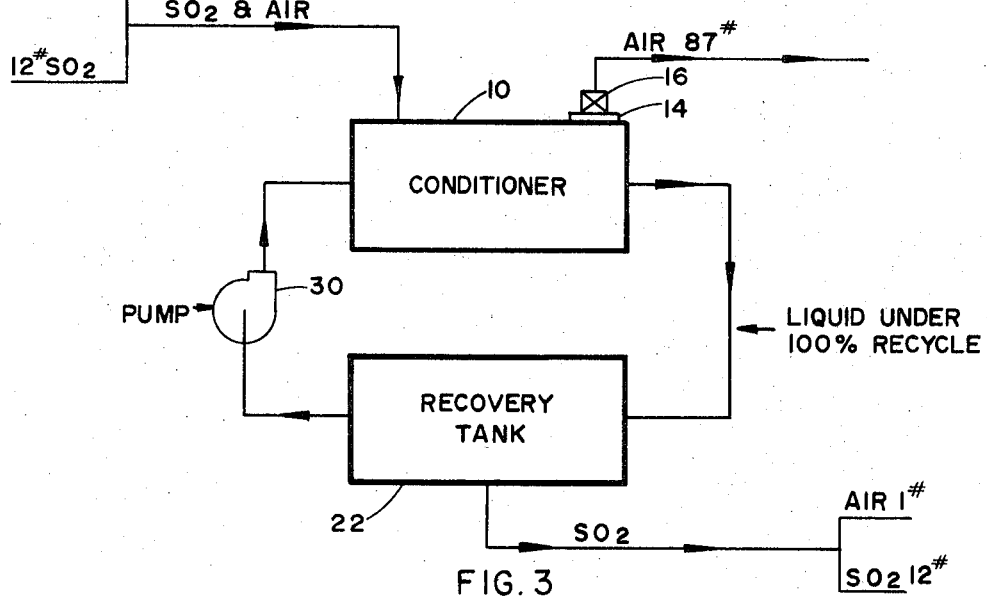
FIG. 3 is a flow diagram of still another type of apparatus for selective separation of gases from a mixture thereof.

In addition to the examples set forth above in connection with the use of the exemplary apparatus shown in FIGS. 1 and 2, the present invention may be employed for the separation of certain types of industrial gases, either waste gases or otherwise. One exemplary arrangement is shown in FIG. 3 in connection with the recovery of useful sulfur from stack gases originating in power plants and the like. If a mixture of stack gases comprising air and sulfur dioxide in the exemplary, approximate proportions shown in FIG. 3, is introduced under pressure into the closed conditioner tank 10, while circulating water continuously through the conditioner by means of a circulating pump 30 in a manner to maintain the conditioner 10 free of any gas head above the water, the water continuously passes through the recovery tank 22 which corresponds to the flotation tank 22 in FIG. 2. The far greater solubility coefficient of $SO_2$, when introduced under pressure in water, results only in a very slight amount of the air being dissolved in the water while substantially all of the sulfur dioxide can be dissolved if the pressure and flow rate of the water and gas, and retention time are suitably regulated. The result is that, at atmospheric pressure which exists in the recovery tank 22, the liquid remains substantially fully saturated with $SO_2$, while excessive $SO_2$ discharges by bubbling out of the solution in the recovery tank 22 and is recovered in nearly pure condition, being diluted only by a very small percentage of air.

From the foregoing, it will be seen that the continuous recycling of the liquid solution is responsible for the very inexpensive recovery of a desired component of a waste gas mixture thereof for example, such as the $SO_2$ component of waste stack gases. Numerous other types of gases may similarly be recovered by waste sources thereof.

Figure 4:
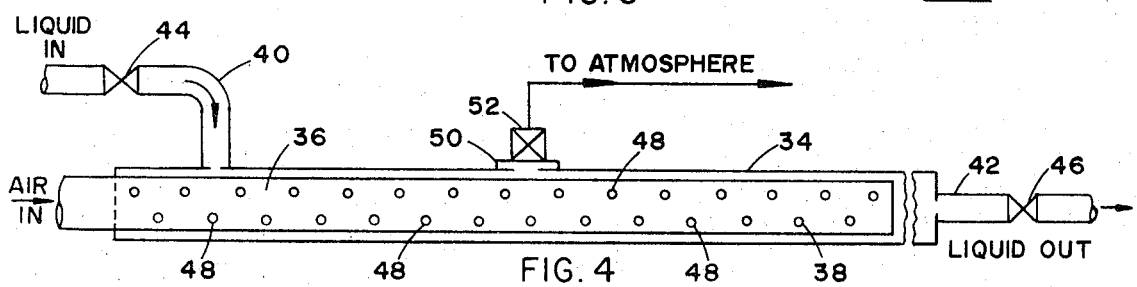
FIG. 4 is another embodiment of exemplary gas absorption apparatus embodying the principles of the invention.

Referring to FIG. 4, a somewhat different absorption apparatus is shown over that in the preceding figures. Primarily the apparatus of FIG. 4 is intended for high speed absorption without sacrifice of efficiency. The tank 34 may comprise a section of commercial pipe or tubing of suitable diameter and length. The opposite ends are closed. A sparger tube 36 extends through one end of tank 34, in sealed relationship therewith. The diameter of sparger 36 is only a little less than that of the inner diameter of tank 34 so that there is a relatively thin elongated cylindrical space 38 between the sparger and tank wall through which the water passes in intimate contact with the sparger while traveling at a high velocity from inlet 40 to discharge conduit 42. The discharge end of tank 34 preferably extends substantially beyond the inner end of the sparger tube 36 as shown by the foreshortening break therein as seen in FIG. 4, to provide for desired dwell time of the water or other liquid being treated. Control valves 44 and 46 respectively are in the inlet 40 and discharge conduit 42 so that desired control of inlet to discharge rate of the water may be effected and thereby insure that no head of air will occur in tank 34 even though the sparger is discharging air at appropriate pressure over a wide area into the flowing water from a substantial number of air ports 48.

Excess air will rise to an appropriate dome 50 and a small amount of water also preferably will constantly enter the dome for regulated discharge from valve 52, similar to valve 16 in FIG. 1, for discharge of such excess air and a small amount of water to atmosphere or otherwise. Apparatus of this type is highly capable of discharging substantial quantities of saturated and supersaturated water for treatment purposes to reduce B.O.D. or C.O.D. or otherwise, while requiring only minimum power consumption to move the water through the apparatus or pump the air into the same. Such apparatus also may be used in lieu of the conditioners 10 in the preceding figures of the drawing relative to selective absorption of gases or chemical treatment processes.

Apparatus of the types described above readily lends itself to being skid or vehicle-mounted and may be manufactured in a range of capacities. When functioning as a conditioner aerator with a pond, the operation will not noticeably disturb the pond surface or spread contaminants to the atmosphere. It also is possible on a practical and economical basis for the conditioner-aerator of the system to hold ponds at at high as 98% oxygen saturated when used in water purifying situations. Further, the apparatus and process, for example, lends itself readily to treating liquid with an inert gas, such as nitrogen, very inexpensively, in certain anaerobic processes, the nitrogen being discharged as excess undissolved gas from the liquid pressure tank or conditioner.

The efficiency of dissolving gases, including air, in liquids such as water, especially in the theorically complate absence of atmosphere above the liquid, can readily be appreciated from the following statistics.

According to Henry's law, gas at zero gage pressure equals, aproximately 15 p.s.i. absolute (p.s.i.a.).

At one atmosphere, $O_2$ dissolves in water approximately to the extent of 40 parts per million (p.p.m.).

At two atmospheres, approximately 80 p.p.m. dissolves.

At three atmospheres, approximately 120 p.p.m. dissolves.

Assuming air, by volume, to be approximately 80% $N_2$ and 20% $O_2$, according to Dalton's law of partial pressures, this results in:

80% pressure $N_2$+20% pressure $O_2$=15 p.s.i.a.

$N_2$—80% (15 p.s.i.a.)=12 p.s.i.a.
$O_2$—20% (15 p.s.i.a.)= 3 p.s.i.a.
Air 100% (15 p.s.i.a.)=15 p.s.i.a

Dissolving air in water with 1-air atmosphere above:

$O_2$ 1 atmos 20% (15 p.s.i.a.) 40 p.p.m.=8 p.p.m.
$O_2$ 2 atoms 20% (39 p.s.i.a.) 80 p.p.m.=16 p.p.m., etc.
$N_2$ 1 atmos 80% (15 p.s.i.a.) 10 p.p.m.= 8 p.p.m.
$N_2$ 2 atmos 80% (30 p.s.i.a.) 20 p.p.m.=16 p.p.m. etc.

Dissolving air in water with no atmosphere above:

$O_2$ 1 atmos 100% (15 p.s.i.a.) 40 p.p.m.=40 p.p.m.
$O_2$ 2 atmos 100% (30 p.s.i.a.) 80 p.p.m.=80 p.p.m. etc.
N 1 atmos 100% (15 p.s.i.a.) 10 p.p.m.= 10 p.p.m.
N 2 atmos 100 (30% p.s.i.a.) 20 p.p.m.=20 p.p.m. etc.

It is to be understood that the foregoing is submitted primarily as exemplary to illustrate the basic principle of the invention that when all the back pressure is completely liquid (hydraulic), with no atmospheric pressure above it, instead of 8 p.p.m. of $O_2$ being dissolved with atmosphere above it, at least a theoretical amount of 40 p.p.m. will be dissolved in the absence of atmosphere, an increase of 500% in efficiency. Even with actual operating losses, gains in efficiency reasonably close to such example are possible.

While the invention has been described and illustrated in its several preferred embodiments, it should be understood that the invention is not to be limited to the precise details herein illustrated and described since the same may be carried out in other ways falling within the scope of the invention as illustrated and described.

I claim:
1. A process for treating liquid and gases comprising the steps of feeding a selected liquid into a closed tank at a predetermined rate to maintain said tank full of liquid, introducing at least a single gas into said selected liquid within said tank under pressure greater than atmospheric to dissolve the same therein while moving said liquid within said tank between inlet and discharge locations therein at a speed adequate to at least completely saturate said liquid therewith, and continuously removing said saturated liquid from said discharge location in said tank at a rate slightly less than the feed rate thereof and thereby retain said tank full of liquid with no appreciable head of gas thereon, and continuously bleeding a small amount of said liquid and any excess undissolved gas from an upper portion of said liquid in said tank to insure maximum absorption of gas within said selected liquid.

2. The process according to claim 1 in which a mixture of gases having different solubility coefficients in said liquid is introduced at a rate and pressure adequate to permit said liquid to dissolve substantially a maximum amount of the most readily soluble gas component of said mixture at said pressure, and permitting the excess undissolved amounts of said lesser soluble gases to discharge automatically from said liquid with said small amount of liquid continuously bled therefrom.

3. The process according to claim 1 including the additional step of recirculating said liquid through said closed tank after releasing the pressure thereon to permit segregation of at least a portion of the gas therefrom, and reintroducing additional gas thereinto under pressure to again effect super-saturation of said liquid, followed by subsequent discharge of excess gas therefrom at reduced pressure and thereby obtain a supply of such gas recovered from a mixture of said gas and other gases.

4. Treating mechanism to saturate liquid with a gas comprising in combination, a substantially horizontal conditioner tank closed to atmosphere and having inlets therein adjacent one end respectively connectable to supply conduits for liquid and gas, perforated sparger means to introduce gas under pressure and liquid into said tank through said inlet to fill said tank with said liquid and operable to at least partially dissolve said gas in said liquid in said tank and thereby place said liquid under pressure in said tank, continuously open and restricted discharge means on an upper portion of said tank spaced from said gas inlet means and operable automatically to discharge excess undissolved gas and a limited amount of liquid continuously from said tank, liquid discharge means in said tank adjacent the opposite end thereof and spaced from said restricted discharge means for discharging liquid saturated with said gas, and liquid discharge control means operable to control the pressure on the liquid in said tank in relation to the inlet rate and the amount of discharge of liquid from said restricted discharge means to insure maintaining said tank full of liquid and no appreciable head of gas therein above the liquid and thereby effect the dissolving of maximum amounts of gas in said liquid at maximum efficiency.

5. The treating mechanism according to claim 4 in which said gas inlet means comprises a perforated sparger positioned below the top of said tank.

6. The treating mechanism according to claim 4 in which said restricted gas discharge means comprises a dome of restricted size rising at least slightly above the upper wall of the tank and an adjustable discharge valve operable continuously to release undissolved gas and a limited amount of liquid from said tank to insure that no head of gas will accumulate above said liquid in said tank.

7. The treating mechanism according to claim 4 in which said liquid discharge control valve comprises a throttle valve, and said mechanism further including a flotation tank connected to said throttle valve and operable to receive substantially saturated liquid therefrom under pressure and permit said pressure to be reduced for release of excess gas from said liquid while said liquid remains substantially completely saturated with said gas at said reduced pressure.

8. The treating mechanism of claim 4 in which said tank is substantially longer than its diameter and said sparger is elongated and extends substantially coaxially and longitudinally within said tank, the diameter of said sparger being slightly less than the inner diameter of said tank and said sparger also being perforated throughout its circumference and length to discharge gas over an extensive area in the cylindrical space between said sparger and tank within which the liquid flows.

9. The treating mechanism according to claim 8 in which the inlet and discharge means for liquid in said tank are respectively adjacent opposite ends thereof.

References Cited
UNITED STATES PATENTS

| | | | |
|---|---|---|---|
| 1,152,458 | 9/1915 | Waggoner | 261—77X |
| 1,299,455 | 4/1919 | Garner | 55—56X |
| 1,429,175 | 9/1922 | Thompson | 55—56X |
| 2,029,017 | 1/1936 | Cooney | 261—77X |
| 2,492,253 | 12/1949 | Wobser et al. | 261—77X |
| 2,759,715 | 8/1956 | Alexander | 261—77X |
| 2,849,371 | 8/1958 | Gilmore | 55—89X |
| 2,875,848 | 3/1959 | Cathala | 55—73X |
| 3,246,885 | 4/1966 | Stevens | 261—77 |
| 3,383,838 | 5/1968 | Carson | 55—73X |
| 3,432,992 | 3/1969 | Moore | 55—55X |
| 3,446,488 | 5/1969 | Mail et al. | 210—221X |

TIM R. MILES, Primary Examiner

U.S. Cl. X.R.

55—55, 56, 73, 89, 95, 256; 261—124; 210—221; 209—170